United States Patent [19]

Castellani et al.

[11] Patent Number: 4,572,923
[45] Date of Patent: Feb. 25, 1986

[54] PRESS-FITTABLE CABLE-PASSAGE ENABLING DEVICE

[75] Inventors: Norman Castellani, Paramus; Anthony Holland, Emerson, both of N.J.

[73] Assignee: Raceway Components, Inc., Nutley, N.J.

[21] Appl. No.: 547,437

[22] Filed: Nov. 1, 1983

[51] Int. Cl.⁴ .............................................. H02G 3/22
[52] U.S. Cl. .................................... 174/48; 220/3.6; 248/27.1
[58] Field of Search ................ 174/48; 248/27.1, 27.3; 220/3.6

[56] References Cited

U.S. PATENT DOCUMENTS

| | | | |
|---|---|---|---|
| 3,995,102 | 11/1976 | Kohaut | 174/48 |
| 4,091,231 | 5/1978 | Sotolongo | 174/48 |
| 4,264,779 | 4/1981 | Rhodes et al. | 174/48 |
| 4,336,416 | 6/1982 | Goodsell | 174/48 |
| 4,496,790 | 1/1985 | Spencer | 174/48 |

Primary Examiner—A. T. Grimley
Assistant Examiner—D. A. Tone
Attorney, Agent, or Firm—Howard N. Sommers

[57] ABSTRACT

A device for enabling cables to be pulled therethrough and through a cellular floor system in which the device is adapted to be mounted, for activating a service fitting at a desired location in the floor. The device is press-fittable into aligned substantially uniform-diameter holes, formed through the slab floor, after setting of the concrete therein, and through an adjacent wall of a raceway cell in an underfloor raceway cellular deck.

30 Claims, 9 Drawing Figures

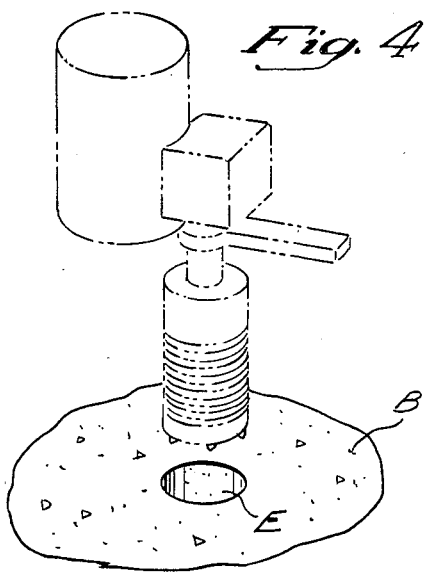
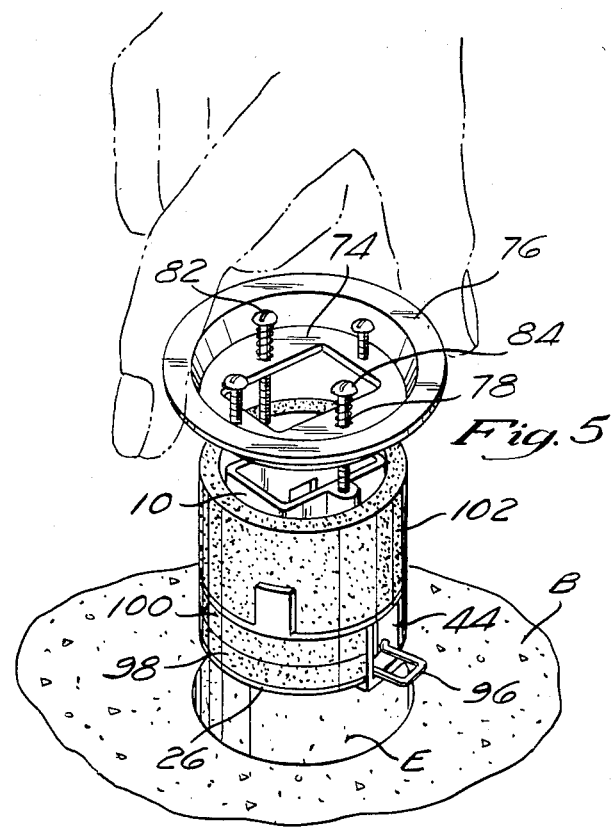
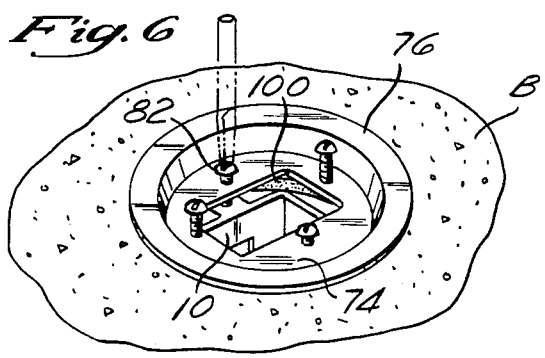
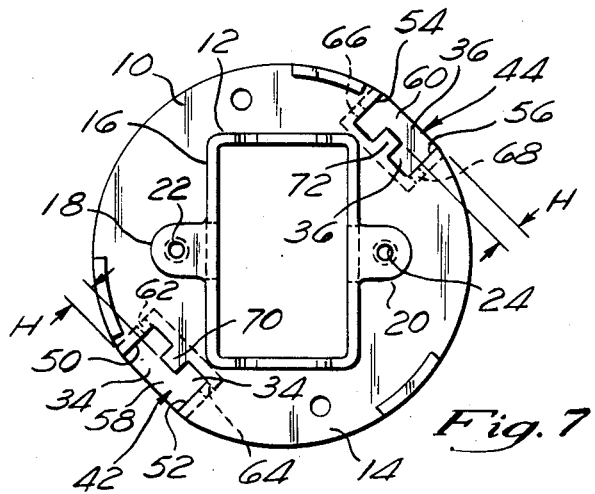
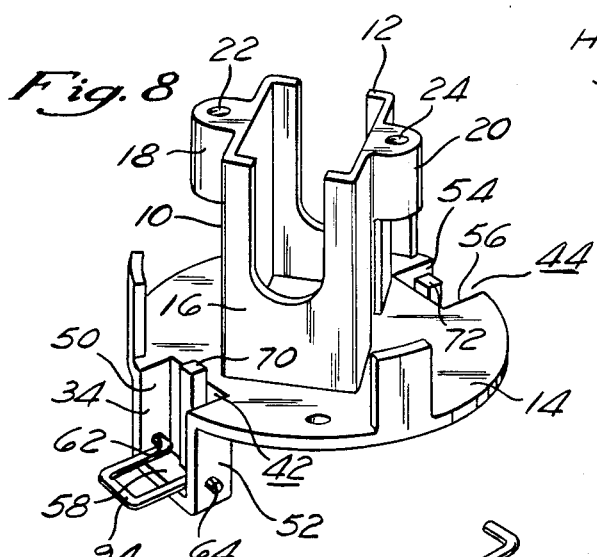

PRESS-FITTABLE CABLE-PASSAGE ENABLING DEVICE

The device includes a hollow housing, including a toggle mechanism for securing the device to the raceway cell wall at one end of the device. The toggle mechanism includes pivoted members, automatically extendable into engaging relation relative to the wall of the raceway cell, when such members clear the raceway cell wall upon insertion of the device therethrough. The device further includes an adjusting mechanism for securing the device to the floor, operable from the other end of the device. The adjusting mechanism is automatically adaptable to accommodate a range of varied-thicknesses in slab floors. The device still further includes intumescent members, in the hollow housing, which expand under self-generated pressure, upon being subjected to heat, to fill the hollow channel in the device through which the cables pass, and any space formed by any burned-off insulation of the cables passing therethrough, and fill the hole in which the device is mounted, to prevent transmission of heat, fire, or smoke therethrough.

BACKGROUND OF THE INVENTION

The invention relates generally to devices for enabling cables to be pulled from an underfloor raceway deck through a concrete slab floor for connection to an in-floor service fitting for such cables, to activate the service fitting. It relates specifically to a device insertable into a hole formed through the slab floor, after setting of the concrete therein, and through an adjacent raceway cell wall.

The prior art discloses insert devices, adapted to be preset by being mounted on an underfloor cellular raceway deck prior to forming the concrete slab floor. For activation thereof, the particular preset insert device at the desired location for a cable service fitting is located, and the concrete thereabove is tapped away from the surface of the enclosing cover plate thereon. The cover plate is then removed, whereupon the cables may be pulled through the preset device for connection to the service fitting to activate same.

However, a multiplicity of such preset insert devices must be mounted on the raceway deck, in rigid linear modular configurations, to insure the location of one such device at a to-be-selected desired location. Most of such preset devices are never used, which makes the use of such devices very expensive and inefficient. Further, a preset insert device may not be located at the precise desired location when activation occurs.

The prior art further discloses insert devices, adapted to be mounted in a slab floor after setting of the concrete therein, and in an adjacent underfloor raceway cell, through which concentric different-diameter holes may be formed for receiving the device. A single afterset insert device may be installed at the precise desired location resting on a platform formed by the smaller-diameter concentric hole in the underfloor raceway cell for activation of the service fitting, thus economizing over the use of a multiplicity of preset insert devices.

However, the prior art does not disclose an afterset insert device, installable in a substantially uniform-diameter hole formed in the slab floor and underfloor raceway cell, including a mechanism at one end thereof, automatically engageable with the raceway cell wall, upon such end clearing the raceway cell wall, without the use of any tools, operable and adjustable rapidly and efficiently from the opposite end of the device upon pressing same into and through the hole in the floor and raceway cell wall, with positioning maintained through pressure exerted therein.

Further, in installing afterset insert devices, the fire rating of the slab floor is significantly affected by forming the hole through the slab floor in which the aforeset insert device is to be mounted. Such hole through the slab floor, with the hollow afterset insert device mounted therein, enables heat, fire, or smoke to pass therethrough and be transmitted from floor to floor, significantly reducing the fire-rating of the floor, causing the floor system to violate the building code, and making the building unsafe.

Further, if a hole of larger diameter is formed through the floor, to enable more cables and/or wider cables to pass therethrough, this increases the transmissibility of heat, fire, or smoke through the floor, further reducing the fire-rating thereof and endangering the safety of people and property in the building.

Building codes have mandated the restoration of the fire rating of the floor, with the through-floor penetrating insert device therein, to the fire rating of the floor without the hole therethrough, for safety purposes.

The prior art discloses the technique of spraying fire-proofing materials on the underfloor cellular raceway deck to prevent the transmission of heat, fire, or smoke, in an effort to comply with the building codes. However, such spray-on fireproofing is expensive, inefficient, and relatively ineffective.

The prior art does not disclose an afterset insert device which is a fire-rated slab penetration, and which includes intumescent elements positioned therein so as to expand and fill the hole in the floor, under self-generated pressure, upon being subjected to heat, to efficiently and effectively prevent through-floor transmission of heat, fire, or smoke, and to thereby restore the fire rating of the slab floor, and comply with the building codes, in an efficient and effective manner, in a cellular floor system without requiring any spray-on fireproofing thereof. It further does not disclose such a device which is automatically vertically adjustable to effectively compensate for floor slab deflection.

SUMMARY OF THE INVENTION

The invention is adapted to overcome the above problems as well as others associated with the prior art. It provides an efficient and rapidly-operable toggle mechanism, for enabling the device to be rapidly and efficiently mounted in a slab floor and an adjacent underfloor raceway cell. The device further includes an adjusting mechanism for securing the device to the floor, operable from the other end of the device. The adjusting mechanism is automatically adaptable to accommodate a range of varied-thickness floors. The device further provides sensing elements which are located therein, which rapidly and efficiently expand and fill the hole in the slab floor in which the device is mounted, upon the occurrence of heat, to prevent through-floor transmission thereof, to restore the fire rating of the floor, and to enable the device to be classified and listed as a fire-rated slab penetration.

The toggle mechanism includes toggle ear members, pivotally mounted in the sides of an end of a hollow housing portion of the device. The hollow housing includes generally U-shaped side portions, which include channel portions thereof extending substantially parallel to the axis of the housing, and end support portions, extending generally perpendicular to the axis of the hollow housing, in the toggle-mechanism end of the hollow housing. The toggle ear members are pivotally mounted in the housing side portions.

The adjusting mechanism includes a hollow plate, the outer diameter of which is greater than the diameter of the hole in the floor. It further includes elongated threaded connectors, engaged in the end of the housing opposite the end in which the toggle ear members are mounted. The threaded connectors extend through the hollow end plate, and coiled springs extend between the threaded connectors and the hollow end plate.

The heat-transmission preventing elements include intumescent members mounted in the toggle-mechanism end of the hollow housing, and a hollow intumescent member supported on a support section and extending about a hollow body section of the hollow housing.

The hollow housing is press-fittable into substantially uniform-diameter holes, core-drilled through the concrete slab floor and through the adjacent wall of an underfloor raceway cell. The toggle ear members pivot into biased positions, upon insertion of the hollow housing into the hole in the slab floor, enabling press-fitting of the device through the aligned holes in the floor and raceway cell wall, without the use of any tools. Upon clearing of the raceway cell wall, the toggle ear members drop into, and are supported by the housing support portions, in positions projecting radially outwardly from the sides of the hollow housing, so as to be engageable with the raceway cell wall, with positioning maintained through pressure exerted therein. The outer diameter of the hollow housing with the toggle ear members projecting therefrom is greater than the diameter of the hole in the raceway cell wall, for rapidly and readily securing the device to the raceway cell.

Upon press-fitting the toggle ear members into engageable positions relative to the raceway cell wall, the hollow end plate may be press-fitted into engagement with the floor. The threaded connectors that are engaged in the holes in the adjacent end of the housing may then be threaded thereinto, against the coiled-spring pressure, drawing the toggle ear members into locking engagement with the raceway cell wall, for effectively and securely clamping and mounting the device in the floor.

Upon the occurrence of heat, and upon being subjected thereto, the intumescent members in the hollow housing expand, under self-generated pressure, generally radially inwardly and radially outwardly. They fill and block the hollow portion of the housing and any channel formed by burned off cable insulation, and fill and block the hole in the slab floor. The intumescent members in the hollow housing prevent fire, heat, or smoke, from the floor below, from being transmitted to the floor above through the hole in the slab floor. They restore the fire rating of the slab floor, with the device mounted in the hole therethrough, as it was without the hole through the slab floor, and enable the device to be fire-rated.

DESCRIPTION OF THE DRAWINGS

FIG. 4 is a perspective view of a hole being formed by core-drilling through the slab floor;

FIG. 5 is a similar view of the afterset insert device being press-fitted into the hole through the floor;

FIG. 6 is a similar view of the afterset insert device being secured in the aligned substantially uniform-diameter holes in the floor and raceway cell wall;

FIG. 7 is a top plan view of the hollow housing, without the toggle ear members mounted therein;

FIG. 8 is a perspective view thereof; and

FIG. 9 is a plan view of a toggle ear member.

DETAILED DESCRIPTION

Figure 1:
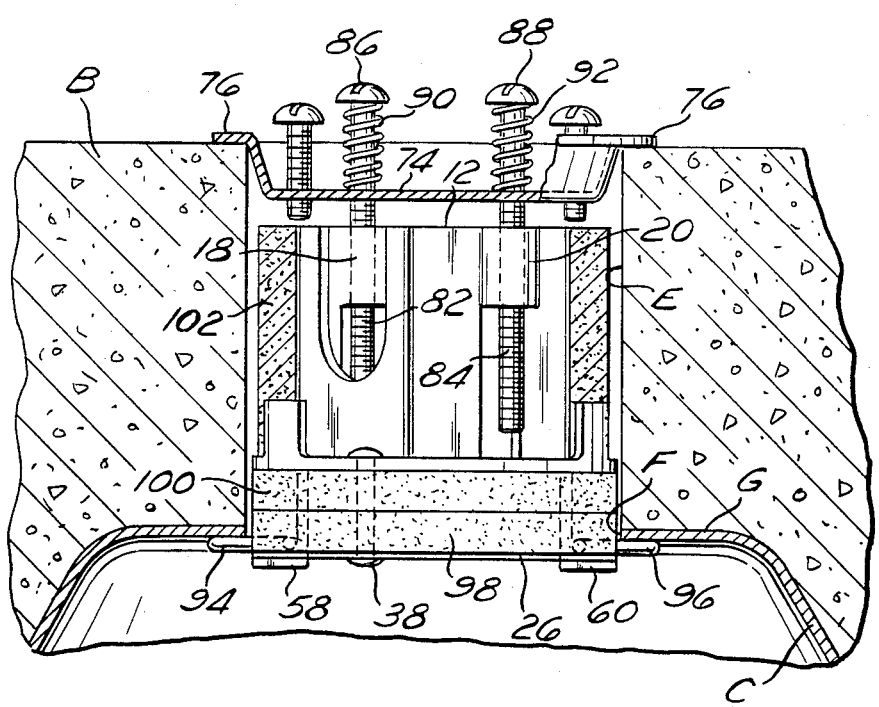
FIG. 1 is an elevational partly cross-sectional view of the afterset insert device mounted in the aligned substantially uniform-diameter holes through the slab floor and the raceway cell wall, pursuant to the invention.
Figure 2:
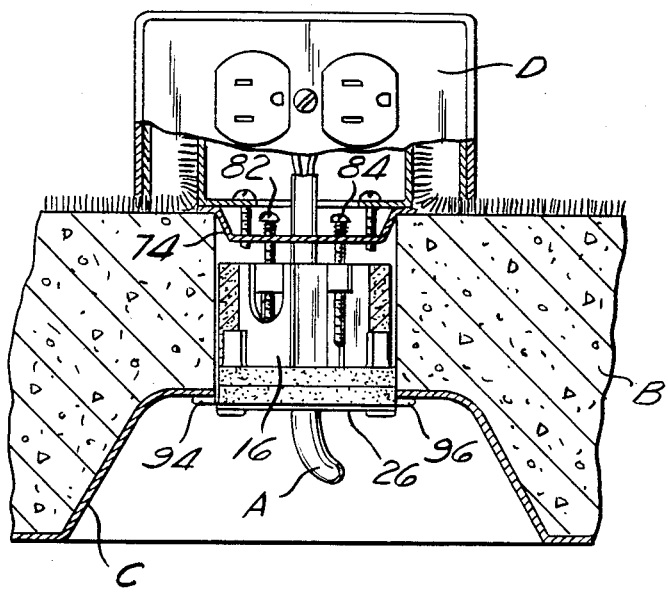
FIG. 2 is a similar view thereof with a service fitting connected to the afterset insert device.
Figure 3:
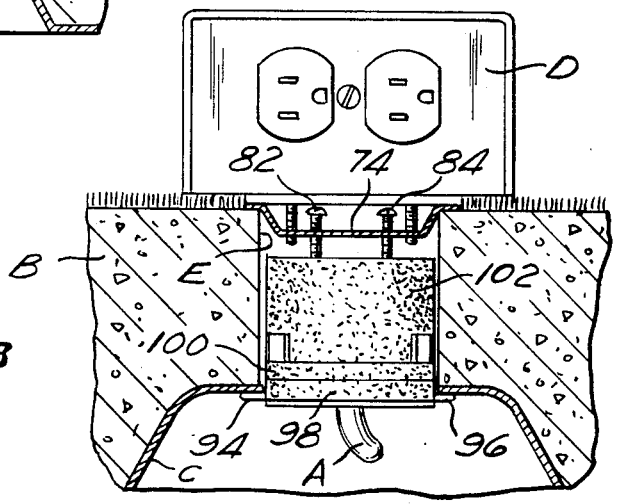
FIG. 3 is an elevational view of the mounted afterset insert device with the service fitting connected thereto.

The invention, as shown in FIGS. 1–9, and as described herein, comprises a device for enabling cables, as A, to be pulled therethrough and through a cellular floor system including a concrete slab floor B in which the device is adapted to be mounted, for activating a service fitting. Concrete slab floor B is supported structurally by an underfloor cellular raceway deck which includes a plurality of raceway cells, as C. Cables A, which may comprise electrical power, telephone communications, and/or data or CRT computer cables, are initially loosely held in raceway cell C.

Upon installation of the device in floor B and raceway cell C, cables A may be pulled from raceway cell C through the device for connection to a service fitting therefor, such as electrical receptacles in service fitting D, to activate the service fitting at the desired location in floor B. The device shown herein is adapted for use with single service cables A, either high tension power or low tension communication cables, with a single service raceway cell C for holding such cables, and a single service fitting D to be activated by such cables. The device may, however, be readily adapted, by known techniques not described herein, to accommodate a dual service installation, both high tension power and low tension communication cables, for use with a dual service raceway cell and a dual service fitting.

The device is adapted to be inserted into substantially uniform-diameter holes including a hole E, formed through floor B, after setting of the concrete in floor B, and an aligned hole F formed through a wall G of raceway cell C. Substantially uniform-diameter holes E and F in floor B and raceway cell wall G may be formed at the same time by core-drilling thereof. The diameter of holes E and F is preferably two-and-one-half inches ($2\frac{1}{2}''$). Such aligned substantially uniform-diameter holes are different from the standard holes used for prior art devices, in which a hole generally two-and-one-half inches ($2\frac{1}{2}''$) in diameter was core-drilled through the concrete slab floor, and a concentric hole generally two-and-one quarter inches ($2\frac{1}{4}''$) in diameter was cut in the adjacent raceway cell wall, to form a platform on which the device rested.

The device includes a hollow housing 10, generally tubular in shape, an adjusting mechanism, and a toggle mechanism, as shown in FIGS. 1–2 and 7–8. Housing 10 includes a first end 12 and a second opposed end 14. The outside diameter of housing 10 is less than the diameter of aligned holes E and F in floor B and raceway cell wall G respectively, and the hollow portion thereof is adapted to enable the cables A to be pulled therethrough. Hollow housing 10 may preferably comprise a diecast zinc alloy casting.

Housing 10 includes a hollow body section 16, generally tubular shaped and rectangular in cross-section, which includes housing first end 12 therein. Shoulder portions 18 and 20 project sidewardly, from the wider sides of body section 16, and have threaded holes 22 and 24 tapped thereinto from housing first end 12.

A hollow end plate 26 of housing 10 is generally disk-shaped, and is located at housing second end 14. It includes side cut-out portions 28 and 30, each of which is generally C-shaped.

A hollow support section 32 of housing 10 is generally disk-shaped, and extends from body section 16 at a medial part of housing 10. It includes side cut-out portions 34 and 36, generally C-shaped, aligned with side-cut portions 28 and 30 of end plate 26. Connecting pins 38 and 40 connect end plate 26 to support section 32.

Side toggle-supporting sections 42 and 44 of housing 10 extend axially from side cut-out portions 34 and 36 of support section 32 at first axial ends thereof, are generally U-shaped, and the axially-opposed ends thereof interfit in side cut-out portions 28 and 30 of end plate 26. Each toggle-supporting section 42 and 44 includes an axially-extending bottom wall 46 and 48, a pair of side axially-extending walls 50, 52, 54, and 56, and an end wall 58 and 60 at the end thereof opposite the side cut-out portions 34 and 36. Side walls 50, 52, 54 and 56 and end walls 58 and 60 extend radially inwardly along the lengths thereof relative to the outer periphery of support section 32, to bottom walls 46 and 48. End walls 58 and 60 extend in a plane generally perpendicular to the axis of housing 10.

A pair of aligned holes 62, 64, 66 and 68 are formed through each of the side walls 50, 52, 54 and 56 proximate the juncture of side walls 50, 52, 54 and 56, end walls 58 and 60, and bottom walls 46 and 48 in toggle-supporting sections 42 and 44 of housing 10. Ribs 70 and 72 project radially outwardly along the length thereof from bottom walls 46 and 48. The radius from the center of housing 10 to the outside of ribs 70 and 72, is less than the radius from the center of housing 10 to the outside of each side of support section 32 by a distance "H".

The adjusting mechanism includes a hollow end plate 74, generally disk-shaped. End plate 74 includes a peripheral flange portion 76, and has holes 78 and 80 therein. The outside diameter of end plate 26 is greater than the diameter of hole E in floor B, and the hollow portion thereof is adapted to enable the cables A to be pulled therethrough. Elongated threaded connectors 82 and 84 include head portions 86 and 88, and extend through holes 78 and 80 in end plate 74. They are threaded into housing threaded holes 22 and 24 in first end 12 of housing 10. Coiled springs 90 and 92 resiliently connect threaded connectors 82 and 84 to end plate 74. The diameter at the one end of each coiled spring 90 and 92 which bears against the threaded connector head portions 82 and 84 is less than the diameter of threaded connector head portions 86 and 88. The diameter of the opposite end of each coiled spring 90 and 92 which bears against end plate 74 is greater than the diameter of the holes 78 and 80 in end plate 74 through which threaded connectors 82 and 84 extend.

The toggle mechanism includes a pair of toggle ear members 94 and 96, each generally U-shaped, the opposite outer ends of which are inserted in aligned holes 62, 64, 66 and 68 of toggle supporting sections 42 and 44 of housing 10 so as to be pivotably movable therein. The distance "H" between the periphery of support section 32 and ribs 70 and 72 is equal to or greater than the thickness of each toggle ear member 94 and 96, so that toggle ear members 94 and 96 may be recessed in toggle-supporting sections 42 and 44 upon bearing against ribs 70 and 72.

The devide, as shown in FIGS. 1-3 and 5, further includes a plurality of elements for sensing heat, fire, or smoke, and for expanding thereupon under pressure to fill and seal hole E in floor B, under fire conditions, so that the device may be certified as a fire-rated slab penetration. The sensing elements include a pair of generally disk-shaped hollow members 98 and 100, mounted between housing end plate 26 and housing support section 52, which include cut-out generally C-shaped portions on the opposite sides thereof to accommodate side toggle-supporting sections 42 and 44 of housing 10, and which have holes therethrough through which connecting pins 38 and 40 extend. The hollow portions of members 98 and 100 are adapted to enable cables A to be pulled therethrough.

A hollow generally tubular shaped member 102 is adapted to extend about housing body section 16 and to be supported on housing support section 56. The inside diameter of member 102 is greater than the outside diameter of housing body section 16, and the outside diameter of member 102 is less than the diameter of hole E in floor B.

Hollow disk-shaped members 98 and 100, and hollow tubular member 102, are comprised of intumescent material. The intumescent material of which members 98, 100 and 102 are comprised is adapted to expand under self-generated pressure upon being subjected to heat. Such intumescent material may comprise, for example and without limitation, a material known as FS-195, sold by the Technical Ceramic Products Division of the 3M Company. It does not degrade at high temperatures, maintains its form, is mechanically strong, and does not break down or deteriorate when subjected to water pressure. Threaded connectors 104 and 106 are adapted to be connected to service fitting D.

To install the device in floor B and raceway cell C, as shown in FIGS. 4-6, so as to activate a service fitting D at the desired location on floor B, substantially uniform-diameter holes E and F are formed through floor B and raceway cell wall G by core-drilling thereof at the desired location.

The device is then inserted into hole E in floor B, as shown in FIG. 5, by aligning second end 14 of housing 10 with hole E, and pressing down on elongated threaded connectors 82 and 84. Toggle ear members 94 and 96 automatically pivot upwardly upon contacting the wall of hole E, enabling insertion of housing 10 through aligned holes E and F. Such insertion enables automatic vertical adjustment over a range, for example, one and one-quarter inches (1¼"), to accommodate for floor slab deflection.

Upon second end 14 of housing 10 clearing opening F in raceway cell wall G, toggle ear members 94 and 96 drop automatically, by gravity operation, as shown in FIG. 1, so as to be supported on bottom walls 46 and 48 of housing toggle-supporting sections 42 and 44 in positons projecting sidewardly from housing 10. In such positions of toggle ear members 94 and 96, the outside diameter, from the outer end of toggle ear member 94 to the outer end of toggle ear member 96, is greater than the diameter of hole F in raceway cell wall G, such that toggle ear members 94 and 96 are engagable with raceway cell wall G at second end 14 of housing 10.

Upon such insertion of the device into hole E in floor B, flange portion 76 of end plate 74 is press-fittable into engagement with floor B, as shown in FIG. 6. Elongated threaded connectors 82 and 84 may then be readily threaded into threaded holes 22 and 24 in housing 10, drawing housing 10 upwardly, against pressure exerted by coiled springs 90 and 92 extending about portions of threaded connectors 82 and 84. Upon tightening threaded connectors 82 and 84, housing 10 is mounted in aligned holes E and F, by clamping thereof between flange portion 76 of end plate 74 and toggle ear members 94 and 96. Cables A are then pulled from their loosely-held position in raceway cell C through the aligned holes E and F through raceway cell C and floor B, and through the device.

Upon subjecting intumescent members 98 and 100 to heat, such members expand, under self-generated pressure, generally radially inwardly towards the center of housing 10, and radially outwardly towards the wall of hole E. Such pressurized foaming action, radially outwardly, fills and blocks hole E in floor B, and, radially inwardly, fills and blocks the hollow channel in housing 10 and any space formed by melt-down or burn-off of the insulation in which cables A are encased. This causes heat to be shunted, with slab floor B acting as a heat sink.

Upon subjecting intumescent member 102 to heat, such member likewise expands, under self-generated pressure, generally radially outwardly towards the wall of hole E in floor B. Such expansion, under pressure, causes intumescent member 102 to fill and block hole E in floor B, likewise causing any heat to be shunted into slab floor B acting as a heat sink.

Electrical ground continuity is provided, through the device, to raceway cell C, by toggle ear members 94 and 96, side toggle support sections 42 and 44, end plate 26, connecting pins 38 and 40, housing 10, end plate 74, and threaded connectors 104 and 106.

The toggle mechanism, including toggle ear members 94 and 96, and housing side toggle-supporting sections 42 and 44, provide an automatically-engagable, rapidly and readily insertable, efficient and effective mechanism for clearing aligned substantially uniform-diameter holes E and F, and for engaging raceway cell wall G.

The adjusting mechanism, including end plate 74, threaded connectors 82 and 84, and coiled springs 90 and 92, provide an automatically adjustable efficient and effective mechanism for accommodating a range of varied-thicknesses in slab floors and for clamping and securing the device in floor B.

The intumescent members 98, 100, and 102, positioned in housing 10, provide rapid and effective expansion under pressure, so as to fill and block hole E in floor B when subjected to heat. This effectively, efficiently and economically restores the fire rating of the slab floor, with the hole formed therethrough and with the afterset insert device mounted therein, to the fire rating of the slab floor without the hole formed therethrough, so that the device may be classified and listed as a fire-rated slab penetration.

A preferred embodiment of the invention has been set forth above, for the purpose of explaining the invention. However, it is to be understood that variations may be made in such embodiment, which variations are nevertheless within the scope and spirit of the invention, as set forth in the claims herein.

We claim:

1. A device for enabling cables to be pulled therethrough and through a concrete slab floor in which the device is adapted to be mounted, for connection of the cables from a raceway cell in an underfloor raceway cellular deck, to a service fitting for the cables, to which the device is adapted to be connected, to activate the service fitting, which device is adapted to be inserted into a hole to be formed through the floor after setting of the concrete in the floor, and into an aligned hole to be formed in the adjacent wall of the raceway cell, and to be engagable with the floor and automatically positionable in engagable relation relative to the wall of the raceway cell, and further adapted to prevent heat transmission through the device or through the aligned holes to be formed in the floor and raceway cell wall, so as to restore the fire rating of the floor with the hole formed therein to substantially the fire rating of the floor without the hole formed therein, to enable the device to be fire-rated, comprising:
   (a) a hollow housing, generally tubular shaped, the outside diameter of which is less than the diameter of the aligned holes to be formed in the floor and raceway cell wall, the hollow portion of which is adapted to enable the cables to be pulled therethrough, which includes first and second opposed ends;
   (b) hollow means in the first end of the hollow housing for engaging the floor, the outside diameter of which is greater than the diameter of the hole to be formed in the floor, and the hollow portion of which is adapted to enable the cables to be pulled therethrough;
   (c) toggle means in the second end of the hollow housing for engaging the wall of the raceway cell, adapted to enable insertion of the hollow housing into the aligned openings to be formed in the floor and wall of the raceway cell such that the second end may clear the raceway cell wall, and to thereupon automatically extend into engagable relation relative to the wall of the raceway cell; and
   (d) means in the hollow housing for preventing transmission of heat through the device or through the aligned holes to be formed in the floor and wall of the raceway cell, so as to restore the fire rating of the floor with the hole formed therein to substantially the fire rating of the floor without the hole formed therein, adapted to enable the cables to be pulled therethrough.

2. A device as in claim 1, further comprising means for resiliently connecting the floor engaging means to the first end of the hollow housing.

3. A device as in claim 2, in which the floor engaging means comprise a hollow end plate, generally disk-shaped, which has a plurality of holes therein, and the first end of the hollow housing has a plurality of threaded holes therein, and in which the resiliently-connecting means comprise a plurality of threaded connectors, each including a head at one end thereof, each extending through one of the holes in the hollow end plate, and each threadably connected in one of the threaded holes in the first end of the hollow housing, and a plurality of coiled springs, each extending about a portion of one of the threaded connectors, such that the opposed ends of the coiled springs bear against the head of the threaded connector and the hollow end plate, the diameter of the coiled spring at the end thereof bearing against the head of the threaded connector being less than the diameter of the head of the threaded connector, and the diameter of the coiled spring at the end thereof bearing against the hollow end plate being greater than the diameter of the hole in the hollow end plate through which the threaded connector extends.

4. A device as in claim 1, in which the floor engaging means comprise a hollow end plate, generally disk-shaped.

5. A device as in claim 4, in which the hollow end plate includes a peripheral flange portion, adapted to be engagable with the floor.

6. A device as in claim 1, in which the toggle means comprise a plurality of toggle ear members, and means for pivotally supporting the toggle ear members in the sides of the second end of the hollow housing, and for limiting pivoted movement of each of the toggle ear members between a first position enabling insertion of the second end of the hollow housing through the aligned holes to be formed in the floor and raceway cell wall, and a second position engagable with the raceway cell wall.

7. A device as in claim 6, in which the radial length of each of the toggle ear members is such that, upon bearing against the support portion, the outside diameter of the second end of the hollow housing and the extending toggle ear members is greater than the diameter of the hole to be formed in the raceway cell wall.

8. A device as in claim 6, in which the toggle ear members are each generally U-shaped.

9. A device as in claim 6, in which the toggle ear member pivotally-supporting and movement-limiting means comprise channel portions, in the sides of the second end of the hollow housing, in which the toggle ear members are pivotably mounted, extending generally parallel to the axis of the hollow housing, for supporting and limiting movement of the toggle ear members in the first position thereof, and support portions in the second end of the hollow housing, each extending from a side channel portion generally perpendicular to the axis of the hollow housing.

10. A device as in claim 7, further comprising means for biasing the toggle ear members towards the second position, which comprise side rib portions, each extending lengthwise from the side channel portion generally parallel to the axis of the hollow housing and projecting from the side support portion generally perpendicular thereto, such that the toggle ear members bear thereagainst upon insertion of the hollow housing into the hole to be formed in the slab floor.

11. A device as in claim 6, further comprising means for biasing the toggle ear members towards the second position thereof.

12. A device as in claim 1, in which the heat transmission preventing means comprise a hollow member, generally disk-shaped, comprised of intumescent material, the outside diameter of which is less than the diameter of the hole to be formed in the floor.

13. A device as in claim 1, in which the hollow housing comprises a hollow body section, which includes the first end of the hollow housing, a hollow plate section at the second end of the hollow housing, generally disk-shaped, and a connector, connecting the hollow plate section to the hollow body section.

14. A device as in claim 13, in which the heat transmission preventing means comprise a first hollow member, generally disk-shaped, comprised of intumescent material, mounted between the hollow plate section in the second end of the hollow housing and the hollow body section of the hollow housing.

15. A device as in claim 13, in which the hollow housing further comprises a support section spaced from the hollow plate section in the second end of the hollow housing, the outside diameter of which is greater than the outside diameter of the hollow body section of the hollow housing.

16. A device as in claim 15, in which the heat transmission preventing means comprise a first hollow member, generally disk-shaped, the outside diameter of which is less than the diameter of the hole to be formed in the floor, comprised of intumescent material, mounted between the support section of the hollow housing and the hollow plate section in the second end of the hollow housing.

17. A device as in claim 16, in which the heat transmission preventing means further comprise a second hollow member, generally tubular shaped, the inside diameter of which is greater than the outside diameter of the hollow body section of the hollow housing, the outside diameter of which is less than the diameter of the hole to be formed in the floor, adapted to be positioned so as to extend about the hollow body section and to be supported on the support section of the hollow housing.

18. A device as in claim 1, in which the hole to be formed though the floor after setting of the concrete in the floor, and the aligned hole to be formed in the adjacent wall of the raceway cell, into which the device is adapted to be inserted, are of substantially uniform-diameter.

19. A device for enabling cables to be pulled therethrough and through a concrete slab floor in which the device is adapted to be mounted, for connection of the cables from a raceway cell in an underfloor raceway cellular deck, to a service fitting for the cables, to which the device is adapted to be connected, to activate the service fitting, which device is adapted to be inserted into a hole to be formed through the floor after setting of the concrete in the floor, and into an aligned hole to be formed in the adjacent wall of the raceway cell, and to be engagable with the floor and automatically positionable in engagable relation relative to the wall of the raceway cell, comprising:

(a) a hollow housing, generally tubular shaped, the outside diameter of which is less than the diameter of the aligned holes to be formed in the floor and raceway cell wall, the hollow portion of which is adapted to enable the cables to be pulled therethrough, which includes first and second opposed ends;

(b) hollow means in the first end of the hollow housing for engaging the floor, the outside diameter of which is greater than the diameter of the hole to be formed in the floor, the hollow portion of which is adapted to enable the cables to be pulled therethrough; and (c) toggle means in the second end of the hollow housing for engaging the wall of the raceway cell, adapted to enable insertion of the hollow housing into the aligned openings to be formed in the floor and wall, of the raceway cell such that the second end may clear the raceway cell wall, and to thereupon automatically extend into engagable relation relative to the wall of the raceway cell.

20. A device as in claim 19, further comprising means for resiliently connecting the floor engaging means to the first end of the hollow housing.

21. A device as in claim 20, in which the floor engaging means comprise a hollow end plate, generally disk-shaped, which has a plurality of holes therein, and the first end of the hollow housing has a pluraity of threaded holes therein, and in which the resiliently-connecting means comprise a plurality of threaded connectors, each including a head at one end thereof, each extending through one of the holes in the hollow end plate, and each threadably connected in one of the threaded holes in the first end of the hollow housing, and a plurality of coiled springs, each extending about a portion of one of the threaded connectors, such that the opposed ends thereof bear against the head of the threaded connector and the hollow end plate, the diameter of the coiled spring at the end thereof bearing against the head of the threaded connector being less than the diameter of the head of the threaded connector, and the diameter of the coiled spring at the end thereof bearing against the hollow end plate being greater than the diameter of the hole in the hollow end plate through which the threaded connector extends.

22. A device as in claim 19, in which the floor engaging means comprise a hollow end plate, generally disk-shaped.

23. A device as in claim 22, in which the hollow end plate includes a peripheral flange portion, adapted to be engagable with the floor.

24. A device as in claim 19, in which the toggle means comprise a plurality of toggle ear members, and means for pivotally supporting the toggle ear members in the sides of the second end of the hollow housing and for limiting pivoted movement of each of the toggle ear members between a first position enabling insertion of the second end of the housing through the aligned holes to be formed in the floor and raceway cell wall, and a second position engagable with the raceway cell wall.

25. A device as in claim 24, in which the radial length of each of the toggle ear members is such that, upon bearing against the support portion, the outside diameter of the second end of the hollow housing and the extending toggle ear members is greater than the diameter of the hole to be formed in the raceway cell wall.

26. A device as in claim 24, in which the toggle ear members are each generally U-shaped.

27. A device as in claim 24, in which the toggle ear member pivotally-supporting and movement-limiting means comprise channel portions in the sides of the second end of the hollow housing, in which the toggle ear members are pivotably mounted, extending generally parallel to the axis of the hollow housing, for supporting and limiting movement of the toggle ear members in the first position thereof, and support portions in the second end of the hollow housing, each extending from a side channel portion generally perpendicular to the axis of the hollow housing.

28. A device as in claim 27, further cmprising means for biasing the toggle ear members towards the second position, which comprise side rib portions, each extending lengthwise from the side channel portion generally parallel to the axis of the hollow housing and projecting from the side support portion generally perpendicular thereto, such that the toggle ear members bear thereagainst upon insertion of the hollow housing into the hole to be formed in the slab floor.

29. A device as in claim 24, further comprising means for biasing the toggle ear members towards the second position thereof.

30. A device as in claim 19, in which the hole to be formed though the floor after setting of the concrete in the floor, and the aligned hole to be formed in the adjacent wall of the raceway cell, into which the device is adapted to be inserted, are of substantially uniform-diameter.

* * * * *